A. E. HOGREBE & J. D. FIRMIN.
DYNAMIC CONTROL FOR ELECTRIC MACHINES.
APPLICATION FILED APR. 5, 1911.
1,079,345.
Patented Nov. 25, 1913.
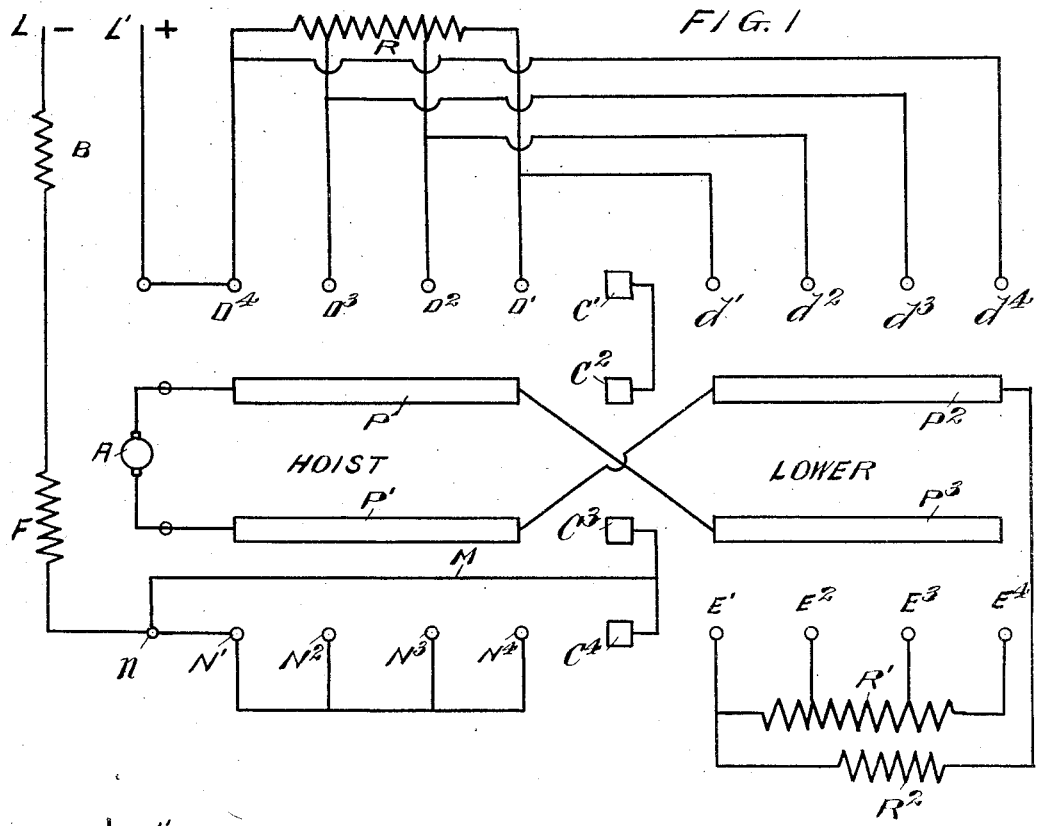
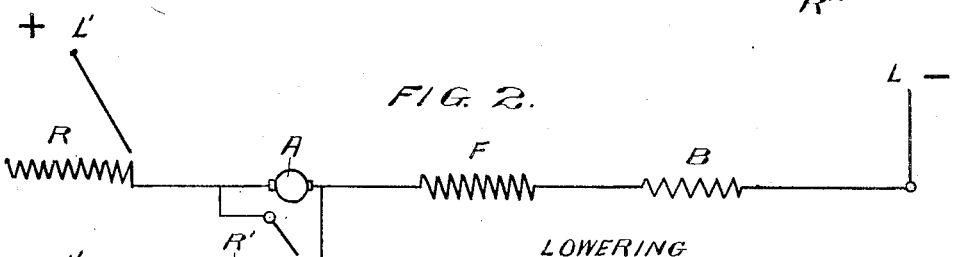
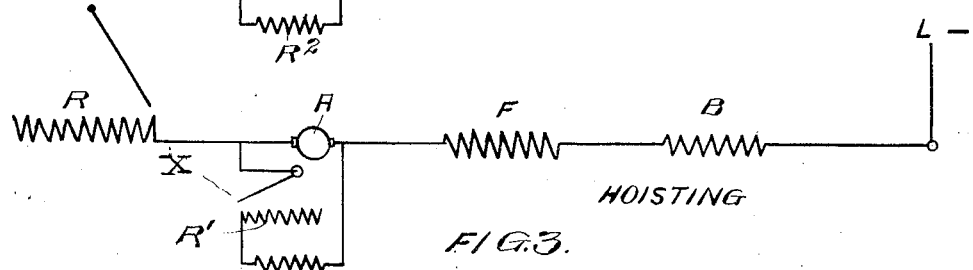
WITNESSES
C. T. Davis
L. B. Aveilhé
INVENTORS
A. E. Hogrebe
J. D. Firmin
by Burd, ...
Attorney

UNITED STATES PATENT OFFICE.

ARTHUR E. HOGREBE AND JOHN D. FIRMIN, OF PHILADELPHIA, PENNSYLVANIA, ASSIGNORS TO NILES-BEMENT-POND COMPANY, OF NEW YORK, N. Y., A CORPORATION OF NEW JERSEY.

DYNAMIC CONTROL FOR ELECTRIC MACHINES.

1,079,345.  Specification of Letters Patent.  Patented Nov. 25, 1913.

Application filed April 5, 1911.   Serial No. 619,188.

*To all whom it may concern:*

Be it known that we, ARTHUR E. HOGREBE and JOHN D. FIRMIN, citizens of the United States, residing in the city of Philadelphia, State of Pennsylvania, have invented a certain new and useful Dynamic Control for Electric Machines, of which the following is a specification.

Our invention relates to a method of winding and control for electric machines of which an important object is to prevent improper acceleration of the armature of the machine under certain conditions.

More particularly the invention is especially adapted to electric hoisting motors. When so adapted the invention contemplates the provision of a special resistance by means of which the motor field may be kept as powerful as necessary independent of the amount of current required at the moment to operate the armature. In this adaptation the invention includes the provision of a controller by which different speeds of the motor, both for hoisting and lowering a load, may be conveniently regulated. In this adaptation of the invention, also, the nonaccelerating feature of the arrangement is made use of to prevent acceleration of the load in lowering. More particularly described, the means for preventing acceleration in lowering consists of a closed armature circuit provided in connection with the other features of the invention. By reason of this closed circuit, when the armature tends to run faster than the rate corresponding to the field density, a high counter-electro-motive force is generated in the armature which overcomes the line voltage and tends to drive a current around the closed circuit in reverse direction. The internal "braking" effect thus set up in the motor prevents the load from accelerating the speed of the armature and maintains the speed constant, as indicated by the momentary position of the controller.

The invention will now be described in sufficient detail with reference to the accompanying drawing, which shows diagrammatically the best form of the invention we have up to the present time devised. It is to be understood that the invention is capable of embodiment in other forms and the present form is only an exemplification of the invention.

Figure 1 is a diagram of the motor and controller, the controller being "developed" or laid out flat. Fig. 2 is a diagram of the motor in lowering condition; and Fig. 3 is a diagram of the motor in hoisting condition.

Referring further to Figs. 2 and 3, A designates an armature and F the field of the motor, in series with the armature, and B designates a brake which is in series with the motor and is used for holding the load when current is shut off of the motor.

R designates a variable resistance in series with the armature circuit and $R^1$ and $R^2$ designate resistances in series with each other of which the first is variable and the second is a fixed resistance. Both of these resistances are in shunt around the armature as shown.

L and $L^1$ represent the positive and negative connections with the line. In hoisting the machine may be, in effect, a series motor. The circuit is opened at X and the line current passes simply through the main variable resistance R, the armature and the field in series. The motor is started as usual with high resistance through the series resistance R and this resistance is cut out to increase the speed as usual. For lowering, however, the circuit at X is closed by means of the movable contact in the shunt, thus affording a closed armature circuit. The load urges the armature to rotate and act as a generator and set up a counter electro-motive force in this closed circuit, the effect of which may be regulated by the variable resistance $R^1$ in combination with the series resistance R. This counter electro-motive force tends to oppose the acceleration of the load and thus a very delicate and close regulation of speed in lowering may be secured which is, of course, of great importance in handling crane loads. In effecting the proper regulation in lowering, the main resistance R is usually reduced simultaneously with the increase of the variable resistance $R^1$ in the armature closed circuit. At commencement of lowering, for instance, the movable contact of resistance R would be to the left, and the movable contact of resistance $R^1$ would also be to the left. With small current in the armature and series field the load will be lowered slowly. Resistance in the armature closed circuit is limited to the fixed resistance $R^2$ which is sufficient to afford the proper retarding effect due to the counter E. M. F. in the armature circuit. Speed may be increased by cutting out the resistance R, and the armature resistance $R^1$ is proportionately increased until the movable contacts are in the position shown in Fig. 2, that is, with series resistance entirely cut out and with all armature resistance inserted.

Fig. 1 shows, diagrammatically, a development of a suitable controller in which $C^1$, $C^2$, $C^3$ and $C^4$ are the movable contacts and are supposed to rotate or slide together to right or left. Movements to the left are for the hoisting positions and to the right for lowering positions.

P, $P^1$ are continuous contacts for brushes $C^2$ and $C^3$ respectively, when in hoisting positions and $P^2$ and $P^3$ are continuous contacts for brushes $C^2$, $C^3$ in lowering positions.

$D^1$, $D^2$, $D^3$, and $D^4$, are contact points in the variable series resistance R for hoisting, and $d^1$, $d^2$, $d^3$ and $d^4$ are similar contacts for lowering. Contacts $d^1$, etc., are bridged across to the corresponding contacts $D^1$, etc. Movable contact $C^1$ is connected with contact $C^2$ and contact $C^3$ is connected with contact $C^4$.

$N^1$, $N^2$, $N^3$ and $N^4$, designate contacts which provide supports for movable contact $C^4$ in hoisting positions.

M is a flexible lead connecting movable contacts $C^3$, $C^4$ with the field circuit at N. Continuous contact $P^2$ is connected by a lead with the permanent armature resistance $R^2$ and the variable armature resistance $R^1$ is provided with contacts $E^1$, $E^2$, $E^3$ and $E^4$. Continuous contact $P^2$ is cross-connected with contact $P^1$ and contact P is cross-connected with contact $P^3$. The movable contacts being in the middle position as shown, current is cut off of the motor. In hoisting, the contacts are moved to the left to the first point. The current then passes from positive line $L^1$ through all of the series resistance R to contact $D^1$, to contact $C^1$, to contact $C^2$, to continuous contact P, through the armature, to continuous contact $P^1$, to contact $C^3$, to contact $N^4$, and through the flexible lead M to the field and thence to the negative line L. Movement of the movable contacts to successive points cuts out the series resistance progressively in an obvious manner. For lowering, the movable contacts are moved to the right to the first point and the circuit is then from positive line $L^1$ through the entire series resistance R to contact $d^1$, to contact $C^1$, to contact $C^2$, to contact $P^2$. Here the circuit divides. Part of the current goes from contact $P^2$ to contact $P^1$, through the armature A in reverse direction, to contact P, to contact $P^3$, to contact $C^3$, and through the flexible lead M to the field and so to the negative line L. The other part of the current commencing at contact $P^2$ goes to the permanent armature resistance $R^2$, to contact $E^1$ without passing through any of the variable resistances $R^1$, to contact $C^4$ and so through flexible lead M and field F to the negative line L.

Successive movement of the movable contacts to different points gradually cuts out the series resistance and increases the variable armature resistance $R^1$ in an obvious manner. The closed armature circuit for lowering, by means of which our dynamic control is obtained, is easily traced in Fig. 1. Commencing at the armature it passes through contact $P^1$ to contact $P^2$, through fixed resistance $R^2$, variable resistance $R^1$, contact $P^3$, contact P and so back to the armature.

Broadly described, the invention comprises a series motor with ordinary series connections, a variable series resistance for hoisting, and a closed armature circuit with variable resistance and also, if desired, an additional fixed resistance for lowering, and means for properly varying the armature resistance in relation to the series resistance.

We claim:

1. The combination of an undivided line circuit including a motor armature, a field, and a variable resistance all in series, a normally open armature circuit containing a variable resistance, and a controller and suitable contacts for varying the series resistance for running in one direction, and for closing the armature circuit and progressively cutting out the series resistance and increasing the armature resistance for running in the other direction.

2. The combination of an armature and field in series on the line, a variable series resistance, a shunt circuit about the armature excluding the field, a fixed resistance and a variable resistance in said shunt circuit, a controller and suitable contacts for opening the armature circuit for running in one direction and for closing the armature circuit and progressively and simultaneously cutting out the series resistance and increasing the armature resistance for running in the other direction.

3. The combination of an undivided line circuit including an armature a field and a variable resistance all in series, a circuit in shunt about the armature, a fixed resistance and a variable resistance therein, a controller and suitable contacts for varying the series resistance for running in one direction, and for closing the armature circuit and progressively cutting out the series resistance and increasing the armature resistance for running in the other direction.

ARTHUR E. HOGREBE.
JOHN D. FIRMIN.

Witnesses:
GEORGE E. BURTON,
SYDNEY BUCKLEY.

Copies of this patent may be obtained for five cents each, by addressing the "Commissioner of Patents, Washington, D. C."